No. 757,805. PATENTED APR. 19, 1904.
W. D. FORD-SMITH & T. COVENTRY.
CLUTCH MECHANISM.
APPLICATION FILED NOV. 16, 1903.
NO MODEL.

No. 757,805. Patented April 19, 1904.

UNITED STATES PATENT OFFICE.

WILLIAM DUNSTAN FORD-SMITH AND THEODORE COVENTRY, OF SALFORD, ENGLAND.

CLUTCH MECHANISM.

SPECIFICATION forming part of Letters Patent No. 757,805, dated April 19, 1904.

Application filed November 16, 1903. Serial No. 181,369. (No model.)

*To all whom it may concern:*

Be it known that we, WILLIAM DUNSTAN FORD-SMITH and THEODORE COVENTRY, subjects of the King of Great Britain and Ireland, and residents of Gresley Iron Works, Salford, in the county of Lancaster, England, have invented certain new and useful Improvements in Clutch Mechanism, of which the following is a specification.

Our invention relates to planing-machines and the like.

Our invention consists in a device for absorbing some of the kinetic energy of the table at the end of either stroke by means of a spring and usefully employing this energy to assist the driving mechanism and, further, to cushion the motion of the parts which have reciprocating or alternating motions, so as to reduce shock. This device will be described in the following specification and its novel features more particularly pointed out in the claim.

Figure 3:
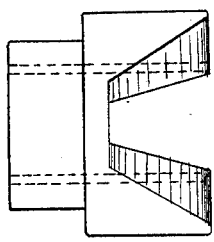
Figure 2:
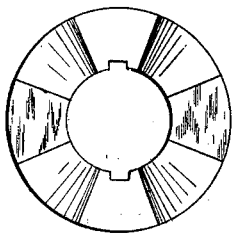
Figure 4:
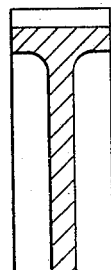
Figure 1:
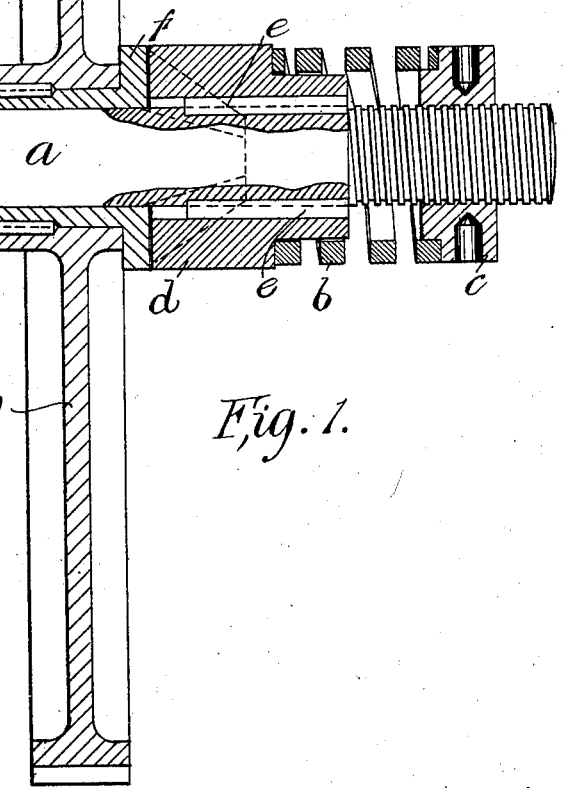

Referring now to the accompanying drawings, which illustrate how our invention is carried into effect in one convenient form, Figure 1 is a sectional view of the device. Figs. 2, 3, and 4 are detail views of part of a clutch employed therein.

The shaft which transmits the power for giving the reciprocating motion to the table is shown at $a$. On this shaft is mounted a powerful coil-spring $b$. One end of this spring presses against a nut or collar $c$, screwed or otherwise fixed on the end of the shaft. The other end of the spring thrusts against one portion $d$ of a clutch. This portion of the clutch is carried by the shaft and forced to rotate with it by virtue of the keys or feathers $e\ e$. This part of the clutch is, however, capable of an endwise movement along the shaft. The other portion, $f$, of the clutch is rigidly fixed to a spur-wheel $g$, which is carried by but free to rotate on the shaft. The two parts of the clutch are provided with teeth having inclined faces adapted to engage with each other. The portion $d$ of the clutch is shown detached in Figs. 2, 3, and 4, from which its construction will be evident. The other portion, $f$, of the clutch has similar teeth. The two parts are so constructed that when a rotary motion is given to one the inclined surfaces cause the two parts to be pushed from each other. The spur-wheel is rotated in one or other direction by the driving mechanism and gives motion to the shaft through the agency of the clutch. Before, however, the spur-wheel can exert any great turning moment on the shaft the portion $f$ of the clutch attached to it must first push from it the other portion, $d$, and so compress the coil-spring. When the coil-spring is compressed an amount which depends on the power being transmitted and the speed of rotation, the shaft will rotate as if the spur-wheel were keyed on it, except that there is a certain amount of flexibility which is useful in preventing injurious shocks while the machine is planing.

At the end of the travel of the table in either direction the driving mechanism is acted on in any usual or convenient manner so as to reverse the direction of rotation of the spur-wheel. As soon as the driving force is removed from the spur-wheel the coil-spring will act through the medium of the clutch, so as to tend to rotate the spur-wheel in the opposite direction to that in which it has just been rotating. The energy in this spring thus does useful work. The next instant the spring will again be compressed by the table continuing its motion, while the spur-wheel is either stationary or rotating in the reverse direction. The spring, owing to the inertia of the table, will probably be now given a greater amount of compression than it will retain during the next stroke, and the energy represented by this surplus compression will go to assist the driving mechanism in moving the table.

Besides the saving of energy the spring will act as a cushion during the reversing action, and thus prevent, or at least very much reduce, the shock that usually takes place at the moment of reversing.

This device we find to be very effective, and it has the great advantage that it can be fitted to existing machines and takes up very little room.

Having now described our invention, what we claim as new, and desire to secure by Letters Patent, is—

In driving mechanism for planing-machines, the combination of a shaft, a wheel loose on the shaft and having a clutch member *f* rigidly connected thereto, a clutch member *d* splined to the shaft, and a spring arranged to be compressed by the separation of the clutch members, the said clutch members having double inclined surfaces between them remaining in engagement when the clutch members are separated and the spring compressed, whereby the power of the spring will react through the said inclines to assist in the driving action, substantially as described.

In witness whereof we have hereunto set our hands in presence of two witnesses.

WILLIAM DUNSTAN FORD-SMITH.
  THEODORE COVENTRY.

Witnesses:
  ROBERT MORRISON NEILSON,
  VIVIAN ARTHUR HUGHES.